(12) United States Patent
Ackermann

(10) Patent No.: US 7,166,681 B2
(45) Date of Patent: Jan. 23, 2007

(54) STORAGE-STABLE COMPOSITIONS OF ORGANOSILICON COMPOUNDS

(75) Inventor: Hartmut Ackermann, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 11/007,789

(22) Filed: Dec. 8, 2004

(65) Prior Publication Data
US 2005/0137362 A1 Jun. 23, 2005

(30) Foreign Application Priority Data
Dec. 18, 2003 (DE) .................. 103 59 588

(51) Int. Cl.
*C08F 283/00* (2006.01)
(52) U.S. Cl. .................................... 525/477
(58) Field of Classification Search ............. 525/477
See application file for complete search history.

(56) References Cited

U.S. PATENT DOCUMENTS

| 4,460,726 A | 7/1984 | Huber et al. |
| 6,265,496 B1 | 7/2001 | Priou et al. |
| 6,590,117 B1 | 7/2003 | Westmeyer et al. |

FOREIGN PATENT DOCUMENTS

| EP | 0 197 540 | 10/1986 |
| EP | 0 197 540 A2 | 10/1986 |
| GB | 594154 | 4/1945 |

*Primary Examiner*—Samuel Barts
(74) *Attorney, Agent, or Firm*—Brooks Kushman P.C.

(57) ABSTRACT

The invention provides storage-stable compositions of organosilicon compounds which comprise
(A) organosilicon compounds which are selected from silanes (A1) of the formula 1

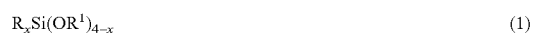

(1)

and resinous organopolysiloxanes (A2) which contain units of the formula

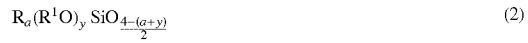
(2)

and bear groups selected from hydroxyl groups bonded to silicon atoms and $C_1$ to $C_{18}$ hydrocarboxy groups bonded to silicon atoms, where
R is a hydrogen atom or monovalent SiC-bonded, optionally substituted $C_{1-18}$ hydrocarbon radicals,
$R^1$ is a hydrogen atom or monovalent SiC-bonded, optionally substituted $C_{1-18}$ hydrocarbon radicals,
x is 0, 1, 2 or 3,
a is 0 or 1 and
y is 1, 2 or 3, and
(B) from 1 to 499 ppm by weight, based on the organosilicon compounds (A), of at least one amino-containing compound.

16 Claims, No Drawings

STORAGE-STABLE COMPOSITIONS OF ORGANOSILICON COMPOUNDS

BACKGROUND OF THE INVENTION

1. Field of the Invention

The invention relates to storage-stable compositions of organosilicon compounds which contain amino-functional compounds, and to a process for stabilizing organosilicon compounds.

2. Background Art

Organosilicon compounds such as compositions based on silanes and organosilanes, polysiloxanes and organopolysiloxanes are employed in many fields, for example as adhesion promoters, crosslinkers in polymers, as release agents, as additives in paints and coatings, for the hydrophobicization of surfaces, including those of textiles and leather, and especially for the protection of buildings and facades, for book preservation, for the special modification of the properties of surfaces such as the coating of glass fibers or the silanization of fillers and pigments, and also for the improvement of the rheological properties of polymer dispersions and emulsions.

For the preparation of silanes and/or organosilanes which have hydroxyl and/or hydrocarboxy groups such as alkoxy groups bonded to silicon atoms, halosilanes, especially chlorosilanes, are generally used. The reaction of a halosilane with an alcohol to obtain an alkoxysilane is known per se to those skilled in the art and is also referred to as "esterification". Hydrolysis of halosilanes, partial alkoxylates thereof and/or alkoxysilanes thereof in aqueous, acidic medium generates polysiloxanes or organopolysiloxanes. In the reaction of trihalosilanes with alcohol, the equilibrium constants decrease from the first to the third stage. This means that a third alkoxy group is particularly difficult to introduce, or that the introduced third alkoxy group reacts readily with hydrogen halide to reform a halosilane and/or halosiloxane structure. The latter are reactive and condense in the course of workup or of storage, whether neat, or a solution or as an emulsion. Even after destillative purification of the product, residual halogen contents, i.e. residues of acidic or hydrolyzable halide, remain in the silanes, organosilanes, polysiloxanes or organopolysiloxanes. This halide, Si-Hal, reacts with functionalities such as silanol groups Si—OH, atmospheric moisture, and residual traces of water or alcohol during storage to produce hydrogen halide which, as a condensation catalyst, can lead to an increase in viscosity of the silanes or polysiloxanes, including in some cases, gelling of the polysiloxanes.

Furthermore, condensation steps in the case of silanes and organosiloxanes which have hydroxyl and/or alkoxy groups bonded to silicon atoms release water and/or alcohol. With alkoxysilanes, traces of water lead to undesired formation of siloxanes. This increases the undesired VOC fraction of the free alcohol.

At present, there are efforts to prepare organosilicon compounds and products which comprise organosilicon compounds, and also compositions based on organosilicon compounds, with very low halide contents. In particular, commercial products are desired which have a very low halide content.

GB 594154 describes the stabilization of organosiloxanes against the action of heat and oxygen with the aid of from 0.05 to 5% by weight of an organic amine. Such large amounts of amine have the effect of shortening the storage stability of hydroxyl- and/or hydrocarboxy-containing organosiloxanes, since they promote gelling thereof at room temperature.

EP 197540 A describes the stabilization of linear organosiloxane oils and thiofunctional organosiloxanes against the action of heat and, where appropriate, kaolin, by addition of an organic amine.

SUMMARY OF THE INVENTION

It is an object of the invention to provide an inexpensive and industrially suitable means for improving the storage stability of organosilicon compounds, especially resinous siloxanes and silanes which can condense to resins, wherein the organosilicon compounds bear hydroxyl and/or hydrocarboxy groups bonded to silicon atoms.

DETAILED DESCRIPTION OF THE PREFERRED EMBODIMENT(S)

The invention provides storage-stable compositions of organosilicon compounds which comprise:

(A) organosilicon compounds which are selected from silanes (A1) of the general formula 1

$$R_x Si(OR^1)_{4-x} \qquad (1)$$

and resinous organopolysiloxanes (A2) which contain units of the general formula 2

$$R_a(R^1O)_y SiO_{\frac{4-(a+y)}{2}} \qquad (2)$$

and bear groups which are selected from hydroxyl groups bonded to silicon atoms and $C_1$ to $C_{18}$ hydrocarboxy groups bonded to silicon atoms, where R independently are a hydrogen atom or a monovalent SiC-bonded, optionally substituted $C_1$ to $C_{18}$ hydrocarbon radical, $R^1$ independently are a hydrogen atom or a monovalent optionally substituted $C_1$ to $C_{18}$ hydrocarbon radical, x is 0, 1, 2 or 3, a is 0 or 1 and y is 1, 2 or 3 and (B) from 1 to 499 ppm by weight, based on the organosilicon compounds (A), of amino-containing compound.

The invention is based on the unexpected discovery that, in the case of organosilicon compounds (A) at customary storage temperatures of from 0 to 100° C., preferably from 5 to 70° C., a limited amount of primary, secondary or tertiary amino-containing compound (B) distinctly increases the storage stability. When this amount is exceeded, the storage stability is again worsened.

The residual amounts of halide, Si-Hal, in the organosilicon compounds (A) which are gradually converted to hydrogen halide in the course of storage may thus be neutralized with the compound (B). Preference is given to using from 5 to 250 ppm by weight, in particular from 10 to 150 ppm by weight, based on the organosilicon compounds (A) of amino-containing compound (B). The optimal amount of compound (B) can be determined by removing compound (B) and the halide salt formed therefrom by extraction processes known per se and analyzing them.

The amine hydrohalide which forms does not have to be filtered out, but rather may also remain in the composition.

The latter may be further processed without changing the formulation. Neither water nor alcohol is released during storage.

The optionally substituted $C_1$ to $C_{18}$ hydrocarbon radicals R and $R^1$ may, for example, be unsubstituted radicals, especially alkyl radicals such as the methyl, ethyl, n-propyl, isopropyl, n-butyl, isobutyl, sec-butyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical, and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; alkenyl radicals such as the vinyl and the allyl radicals; cycloalkyl radicals such as the cyclopentyl, cyclohexyl, cycloheptyl, and methylcyclohexyl radicals; aryl radicals such as the phenyl, naphthyl, anthryl, and phenanthryl radicals; alkaryl radicals such as o-, m-, p-tolyl radicals, xylyl radicals and ethylphenyl radicals; and aralkyl radicals such as the alpha- and the beta-phenylethyl radicals.

The substituted $C_1$ to $C_{18}$ hydrocarbon radicals R and $R^1$ may have, as substituents, for example, halogen atoms, or amino- or thio-bonded organic radicals, preferably those having from 1 to 10 carbon atoms. Examples of halogen-substituted radicals are fluorine- and chlorine-substituted radicals such as the 3,3,3-trifluoro-n-propyl radical, the 2,2,2,2',2',2'-hexafluoroisopropyl radical, the heptafluoroisopropyl radical, and haloaryl radicals such as the o-, m- and p-chlorophenyl radicals. Preferred halogens are fluorine, chlorine and bromine.

Preferred R radicals are hydrogen and unsubstituted hydrocarbon radicals, especially those having from 1 to 8 carbon atoms, especially the methyl, ethyl, vinyl, tolyl and phenyl radicals.

Preferred $R^1$ radicals are hydrogen and $C_1$ to $C_{10}$ alkyl radicals, especially $C_1$ to $C_6$ alkyl radicals. Preferred examples are methyl, ethyl, n-propyl, isopropyl, n-butyl, sec-butyl, isobutyl and tert-butyl radicals, especially methyl und ethyl radicals.

In the organosilicon compounds, a preferably has an average value of from 0.5 to 1.9, in particular from 1.0 to 1.5.

The resinous organopolysiloxanes (A2) which contain units of the general formula 2 preferably have additional units of the general formula 3

$$R_zSiO_{\frac{4-z}{2}} \quad (3)$$

where
z is 0, 1, 2 or 3, preferably on average from 0.5 to 2.5, more preferably on average from 0.8 to 2.3, and R is as defined above.

The resinous organopolysiloxanes (A2) preferably have from 1 to 99 mol-%, in particular from 10 to 90 mol-%, of units of the general formula 3. Organopolysiloxanes (A2) preferably have viscosities of from 0.5 to 1,000,000 mPa·s, in particular from 2 to 500,000 mPa·s.

The primary, secondary and/or tertiary amino-containing compound (B) has 1, 2 or 3 organic radicals on the amino group. The organic radicals may be, for example, optionally halogen-, triorganosilyl- or cyano-substituted $C_1$–$C_{30}$ hydrocarbon radicals in which one or more nonadjacent methylene units may be replaced by —O—, —CO—, —COO—, —OCO— or —OCOO—, —S— or —NH-groups, and in which one or more nonadjacent methine units may be replaced by —N=, —N=N— or —P= groups. The triorganosilyl substituents preferably have radicals which are selected from $C_1$–$C_{10}$ hydrocarbon radicals and $C_1$–$C_6$ hydrocarboxy radicals. The radicals on the amino group are preferably unsubstituted $C_1$–$C_{18}$ hydrocarbon radicals, preferably $C_3$–$C_{15}$ aliphatic radicals.

Examples of compound (B) having triorganosilyl substituents are amino-functional silanes. Preferred amino-functional silanes (B) are those of the general formula 4

$$R^2_u R^3_v Si(OR^4)_{4-u-v} \quad (4)$$

in which
$R^2$ is a monovalent, optionally halogen-substituted, SiC-bonded $C_1$–$C_{20}$ hydrocarbon radical,
$R^3$ is a monovalent, optionally halogen-substituted, SiC-bonded $C_1$–$C_{30}$ hydrocarbon radical having an amino group,
$R^4$ is a hydrogen atom or $C_1$–$C_6$ alkyl radical,
u is 0, 1 or 2 and
v is 1, 2 or 3, with the proviso that the sum of u and v is less than or equal to 3. Examples and preferred examples of the $R^2$ radical have been listed above for the $R^1$ radical.

The $R^3$ radical is preferably a radical of the general formula 5

$$R^5_2NR^6 \quad (5)$$

where
$R^5$ is hydrogen or a monovalent, optionally substituted $C_1$–$C_{10}$ hydrocarbon radical or a $C_1$–$C_{10}$ aminohydrocarbon radical and
$R^6$ is a divalent $C_1$–$C_{15}$ hydrocarbon radical.

Examples of the $R^5$ radical are the hydrocarbon radicals given for the R radical, and also substituted by amino groups, such as aminoalkyl radicals, of which particular preference is given to the aminoethyl radical.

The $R^6$ radical is preferably a divalent hydrocarbon radical having from 1 to 10 carbon atoms, more preferably from 1 to 4 carbon atoms, in particular the n-propylene radical. Examples of the $R^6$ radical are the methylene, ethylene, propylene, butylene, cyclohexylene, octadecylene, phenylene and butenylene radicals.

Examples of preferred amino-functional silanes (B) are 3-(aminoethylamino)propyltrimethoxysilane, 3-(aminoethylamino)-propyltriethoxysilane, 3-aminopropyltriethoxysilane, 3-amino-propyltrimethoxysilane and methyl-3-(2-aminoethylamino)-propyldimethoxysilane.

The storage-stable compositions may contain one type of organosilicon compound (A) or a mixture of different organosilicon compounds (A). The addition of a small amount of aliphatic alcohol may further stabilize the storage-stable compositions.

Additives present in the storage-stable compositions may, for example, include organic solvents, fillers, odorants or corrosion inhibitors.

The invention also provides a process for stabilizing (A) organosilicon compounds which are selected from silanes (A1) of the general formula 1

$$R_xSi(OR^1)_{4-x} \quad (1)$$

and resinous organopolysiloxanes (A2) which contain units of the general formula 2

$$R_a(R^1O)_y SiO_{\frac{4-(a+y)}{2}} \quad (2)$$

and have groups which are selected from hydroxyl groups bonded to silicon atoms and $C_1$ to $C_{18}$ hydrocarboxy groups bonded to silicon atoms, where R, $R^1$, x, a and y are each as defined above, in which the organosilicon compounds (A) are admixed with (B) from 1 to 499 ppm by weight, based on the organosilicon compounds (A), of amino-containing compound(s).

It is possible to use a single compound (B) or else a mixture of two or more different compounds (B). However, the total amount of compound(s) (B) is 499 ppm or less. For better mixing, preference is given to mixing in compound (B) at from 20 to 180° C.

When the compound (B) used is an amino-functional silane, it may be condensed under alkaline conditions to organosilicon compounds (A) and subsequently worked up by neutralization and, if appropriate, filtration. Such systems are self-stabilizing.

In the process for stabilizing the organosilicon compounds (A), the compound (B) may be added directly after the organosilicon compounds (A) have been formed, for example before the removal of solvents, water and/or alcohol. Alternatively, the compound (B) may only be added during the storage of the compositions which comprise organosilicon compounds (A).

All the symbols of the above formulae are each defined independently of one another. In all formulae, the silicon atom is tetravalent.

The invention is illustrated in detail with reference to the examples which follow. All specifications of parts and percentages are based on the weight. The examples are carried out at a pressure of the surrounding atmosphere, i.e. at about 0.1 MPa, and at room temperature, i.e. at about 21° C.

EXAMPLE 1 AND COMPARATIVE EXAMPLES C2 AND C3

Different amounts of triisooctylamine are added with stirring at 80° C. to 100 g of methylsilicone resin consisting of 73% by weight of $CH_3SiO_{3/2}$, 20% by weight of $(CH_3)_2SiO_{2/2}$, 6% by weight of $(CH_3(OC_2H_5)SiO_{2/2}$, and 1% by weight of $CH_3(OH)SiO_{2/2}$, having a viscosity of 5000 mPas and containing 5 ppm by weight of free hydrogen chloride and 95 ppm by weight of chlorine atoms bonded to silicon atoms. The samples of the stabilized resin which are subsequently stored at room temperature (20° C.) had the following stabilities:

TABLE 1

| Example | Addition of amine [ppm] | Storage stability at 20° C. |
|---|---|---|
| C2 | 0 | gelled after 14 weeks |
| 1 | 100 | viscosity increased by 30% after 12 months |
| C3 | 1000 | gelled after 10 weeks |

*non-inventive

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A storage-stable composition of organosilicon compounds, comprising:
   (A) at least one organosilicon compound (A1) or (A2) or a mixture of compounds (A1) and
      (A2) wherein organosilicon compound (A1) has the formula 1

$$R_xSi(OR^1)_{4-x} \quad (1)$$

and organosilicon compound (A2) comprises a resinous organopolysiloxane containing units of the formula 2

$$R_a(R^1O)_y SiO_{\frac{4-(a+y)}{2}} \quad (2)$$

and bears at least one group selected from the group consisting of hydroxyl groups bonded to silicon atoms and $C_1$ to $C_{18}$ hydrocarboxy groups bonded to silicon atoms, where
   R independently is a hydrogen atom or a monovalent SiC-bonded, optionally substituted $C_1$ to $C_{18}$ hydrocarbon radical,
   $R^1$ independently is a hydrogen atom or a monovalent, optionally substituted $C_1$ to $C_{18}$ hydrocarbon radical,
   x is 0, 1, 2 or 3,
   a is 0 or 1 and is on average 0.5 to 1.9,
   y is 1, 2 or 3, and
   (B) from 1 to 499 ppm by weight, based on the organosilicon compound(s) (A), of amino-containing compound(s).

2. The composition of claim 1 which contains from 5 to 250 ppm by weight of amino-containing compound(s) (B).

3. The composition of claim 1, in which the R radicals are each unsubstituted hydrocarbon radicals having from 1 to 8 carbon atoms.

4. The composition of claim 1, in which the $R^1$ radicals are selected from hydrogen and $C_1$ to $C_{10}$ alkyl radicals.

5. The composition of claim 1, in which the resinous organopolysioxane(s) (A2), in addition to units of the general formula 2, contain additional units of the general formula 3

$$R_zSiO_{\frac{4-z}{2}} \quad (3)$$

where
z is 0, 1, 2 or 3.

6. The composition of claim 1, in which the radicals on the amino group are unsubsticuted $C_1$–$C_{18}$ hydrocarbon radicals.

7. The composition of claim 1 in which the compounds (B) are amino-functional silanes of the general formula 4

$$R^2{}_uR^3{}_rSi(OR^4)_{4-u-v} \quad (4)$$

in which
$R^2$ is a monovalent, optionally halogen-substituted, SiC-bonded $C_1$–$C_{30}$ hydrocarbon radical, $R^3$ is a monovalent, optionally halogen-substituted, SiC-bonded $C_1$–$C_{30}$ hydrocarbon radical having an amino group, $R^4$ is a hydrogen atom or $C_1$–$C_6$ alkyl radical, u is 0, 1 or 2 and v is 1, 2 or 3, with the proviso that the sum of u and v is less than or equal to 3.

8. The composition of claim 1 which contains from 10 to 150 ppm by weight of amino-containing compound(s) (B).

9. The composition of claim 1 wherein a has an average value of from 1.0 to 1.5.

10. A storage-stable composition of organosiicon compounds, comprising:

(A) at least one organosilicon compound (A1) wherein organosilicon compound (A1) has the formula 1

$$R_xSi(OR^1)_{4-x} \quad (1)$$

R independently is a hydrogen atom or a monovalent SiC-bonded, optionally substituted $C_1$ to $C_{18}$ hydrocarbon radical, $R^1$ independently is a hydrogen atom or a monovalent, optionally substituted $C_1$ to $C_{18}$ hydrocarbon radical, x is 0, 1, 2 or 3, and (B) from 1 to 499 ppm by weight, based on the organosiicon compound(s) (A), of amino-containing compound(s).

11. The composition of claim 10 which contains from 5 to 250 ppm by weight of amino-containing compound(s) (B).

12. The composition of claim 10 which contains from 10 to 150 ppm by weight of amino-containing compound(s) (B).

13. The composition of claim 10, in which the R radicals are each unsubstituted hydrocarbon radicals having from 1 to 8 carbon atoms.

14. The composition of claim 10, in which the $R^1$ radicals are selected from hydrogen and $C_1$ to $C_{18}$ ailcyl radicals.

15. The composition of claim 10, in which the radicals on the amino group are unsubstituted $C_1$–$C_{18}$ hydrocarbon radicals.

16. The composition of claim 10 in which the compounds (B) are amino-functional silanes of the general formula 4

$$R^2{}_uR^3{}_v\mathrm{Si}(OR^4)_{4-U-V} \quad (4)$$

in which $R^2$ is a monovalent, optionally halogen-substituted, SiC-bonded $C_1$–$C_{20}$ hydrocarbon radical, $R^3$ is a monovalent, optionally halogen-substituted, SiC-bonded $C_1$–$C_{30}$ hydrocarbon radical having an amino group, $R^4$ is a hydrogen atom or $C_1$–$C_6$ alkyl radical, u is 0, 1 or 2 and v is 1, 2 or 3, with the proviso that the sum of u and v is less than or equal to 3.

* * * * *

UNITED STATES PATENT AND TRADEMARK OFFICE
CERTIFICATE OF CORRECTION

| | | |
|---|---|---|
| PATENT NO. | : 7,166,681 B2 | Page 1 of 1 |
| APPLICATION NO. | : 11/007789 | |
| DATED | : January 23, 2007 | |
| INVENTOR(S) | : Hartmut Ackermann | |

It is certified that error appears in the above-identified patent and that said Letters Patent is hereby corrected as shown below:

Column 8, Line 8, Claim 14:

Delete "ailcyl" and insert therefor -- alkyl --.

Signed and Sealed this

Twenty-seventh Day of March, 2007

JON W. DUDAS
*Director of the United States Patent and Trademark Office*